United States Patent [19]

Hoefert

[11] 4,323,978
[45] Apr. 6, 1982

[54] ARITHMETIC ELEMENT BASED ON THE DDA PRINCIPLE

[75] Inventor: Reimar Hoefert, Hamburg, Fed. Rep. of Germany

[73] Assignee: U.S. Philips Corporation, New York, N.Y.

[21] Appl. No.: 102,201

[22] Filed: Dec. 10, 1979

[30] Foreign Application Priority Data

Dec. 12, 1978 [DE] Fed. Rep. of Germany ....... 2853540

[51] Int. Cl.³ .............................................. G06F 7/64
[52] U.S. Cl. .................................................. 364/702
[58] Field of Search ........................................ 364/702

[56] References Cited

U.S. PATENT DOCUMENTS 3,327,102 6/1967 Truitt et al. .......................... 364/702
3,419,711 12/1968 Hunter et al. ........................ 364/702
3,601,591 8/1971 Gaines et al. ........................ 364/702

OTHER PUBLICATIONS

H. Brafman et al., "An incremental Computer", *IEEE Trans. on Computers*, vol. C-26, No. 11, Nov. 1977, pp. 1072-1081.
G. Hannington et al., "A Floating-Point Multiplexed DDA System", *IEEE Trans. on Computers*, vol. C-25, No. 11, Nov. 1976, pp. 1074-1077.

*Primary Examiner*—Jerry Smith
*Attorney, Agent, or Firm*—James J. Cannon, Jr.

[57] ABSTRACT

According to the DDA technique, incremental signals are processed which usually consist of two separate signals for value and sign. An arithmetic element then comprises at least one register and one adder/subtractor. A complex circuit, for example, a control system comprising a plurality of controllers, requires a number of arithmetic elements, partly having different functions, which are to be linked. A number of arithmetic elements are realized in that use is made of a microprocessor which comprises some additional external circuits and which successively deals with the separate arithmetic elements. For effective use of the microprocessor, there is provided a command control device which modifies the microprogram commands, notably in dependence of the increment to be processed; however, this can also be done by other control signals. This step enables more efficient and faster jumps in the microprogram which are not subject to conditions. Furthermore, additional circuits are required for generating the output increment signal from the register contents processed and from the output control signals of the microprocessor.

6 Claims, 6 Drawing Figures

| 24 | 93 | 95 | 96 | 97 | 98 | 60 | 61 | 62 |
|----|----|----|----|----|----|----|----|----|
|    | ER | BLOC | INV | $|\Delta z|$ | sign | RES |   |   |
| 2 | 1 | x | x | x | x | 0 | 4 | 4 |
| 2 | 0 | 1 | x | x | x | R | 4 | 0 |
| 2 | 0 | 0 | x | 0 | x | R | 4 | 0 |
| 2 | 0 | 0 | 0 | 1 | 0 | R+I | 5 | 0 |
| 2 | 0 | 0 | 1 | 1 | 0 | R−I | 5 | 1 |
| 2 | 0 | 0 | 0 | 1 | 1 | R−I | 5 | 1 |
| 2 | 0 | 0 | 1 | 1 | 1 | R+I | 5 | 0 |

ARITHMETIC ELEMENT BASED ON THE DDA PRINCIPLE

BACKGROUND OF THE INVENTION.

The invention relates to an arithmetic element for processing digital input increment signals, the frequency of which indicates an analog quantity, notably digital input increment signals comprising a sign signal according to the DDA (digital differential analyser) principle, comprising at least one arithmetic device for executing add and subtract operations, and at least one operand register which is connected to a data input of the arithmetic device.

Arithmetic elements of this kind are known, for example, from U.S. Pat. No. 3,035,768 and from the book "The Digital Differential Analyser", T. R. H. Sizer, ed. Chapman & Hall, London, 1968, notably pages 11 to 27. The DDA technique was developed to enable replacement of, for example, pure analog arithmetic elements. This technique utilizes so-called increment signals. These signals are often ternary signals which in practice consist of two separate but associated binary signals, that is to say a value signal and a sign signal which together describe the three states $+1, 0, -1$. The value of an analog signal is proportional to a pulse frequency of the value signal; this is also referred to as a "frequency-analog signal". The associated sign signal indicates the polarity. When such a pulse frequency is applied to an up/down counter whose counting direction is determined by the sign signal, the value pulses are algebraically summed in accordance with the sign. Thus, an integration is achieved, the result thereof being present in the counter as a binary number. Similarly, other known analog arithmetic elements can be realized by digital means.

Like in the analog technique, known arithmetic elements based on the DDA principle and constructed for different functions also require devices of different construction. This implies very high costs of manufacturing and storage. Furthermore, the digital components available thus far reach processing speeds which are not necessary for most applications of the DDA principle, so that part of their capacity remains unused. Finally, the cost of digital components is generally higher than that of analog components. The advantages of the digital technique, notably the higher accuracy, are then accompanied by comparatively high costs.

SUMMARY OF THE INVENTION

It is an object of the invention to provide an arithmetic element of the described kind which is as universal as possible and which utilizes the possiblities offered by the digital technique and the available digital components to a high degree. This object is achieved in accordance with the invention in that the arithmetic device comprises:

(a) a program memory for supplying program signals on a first output;

(b) a microprocessor with a first input which can be coupled to said first output and having an adder/subtractor with a data output;

(c) a command control device which is connected between said first input and first output and which comprises a second input for receiving a control signal in order to modify a program signal;

a value signal ($\Delta z$) of an output increment signal being formed from the EXCLUSIVE-OR combination of the most-significant bit signal on said data output and the most-significant bit from said operand register, the sign signal of this output increment signal (sign $\Delta z$) being formed from the EXCLUSIVE-OR combination of the most-significant bit on said data output and a location overflow indication bit. Thus, a universal arithmetic element is formed which, moreover, can also perform pure digital processing steps such as the comparison of two binary words. The further step also increase the efficiency of the use of a microprocessor in DDA arithmetic elements.

Preferably, for the execution of a predetermined number of separate operations according to the DDA principle, said operand register has a multiple construction and a capacity for the combined storage of at least one operand signal for each of said predetermined number of separate operations, said program memory being adapted to supply said predetermined number of operand signals, each time separately and cyclically, together with associated frequency-analog signals, to said adder/subtractor in order to be processed therein, a memory being provided which comprises, for each of said predetermined number of separate operations, a memory location in order to receive and store an output increment signal from said adder/subtractor.

Thus, a plurality of DDA arithmetic elements, each having its own specific operations, is combined in a single fast microprocessor. For example, a control circuit often requires a plurality of independent DDA elements. These elements are now implemented together and hence are cheaper.

The available microprocessors generally comprise their own memory with several memory locations, so that the registers of the various DDA arithmetic elements can be formed by the memory. For some arithmetic elements, for example, an integrator or a comparator, the contents of two registers would then have to be processed together. If the microprocessor is capable of addressing only one memory location per unit of time, each of said several memory locations is preferably assigned to a different one of said predetermined number of separate operations and, if an operation activates two input quantities in its own memory, the memory location assigned to the relevant operation preferably acts as an increment register. In the case of an integrator, the construction of which will be described at a later stage, the content of a modular register is provided which can be simultaneously read from an external memory and applied to the microprocessor. The simultaneous addressing of the two registers is realized by the command signals from the program memory.

If the number of said several memory locations is smaller than said predetermined number of operations, the processing steps for said separate operations are preferably cyclically, block-wise successively executed in that the microprocessor first takes over the contents of a number of external increment registers associated with a block of operations in its own memory, successively performs the processing steps for these operations and reads at the same time the new value of the output increment signals for writing in said external increment registers, and finally starts the taking over of the signal values of the next block of operations. Thus, a high processing speed can be achieved. Notably in the case of a microprocessor which is capable of simultaneously addressing two memory locations, preferably those operations are combined in blocks where several output values have to be processed, for example, a comparison of the contents of the increment registers.

BRIEF DESCRIPTION OF THE FIGURES

Embodiments in accordance with the invention will be described in detail hereinafter with reference to the accompanying diagrammatic drawings.

DESCRIPTION OF THE EMBODIMENTS

Figure 1:
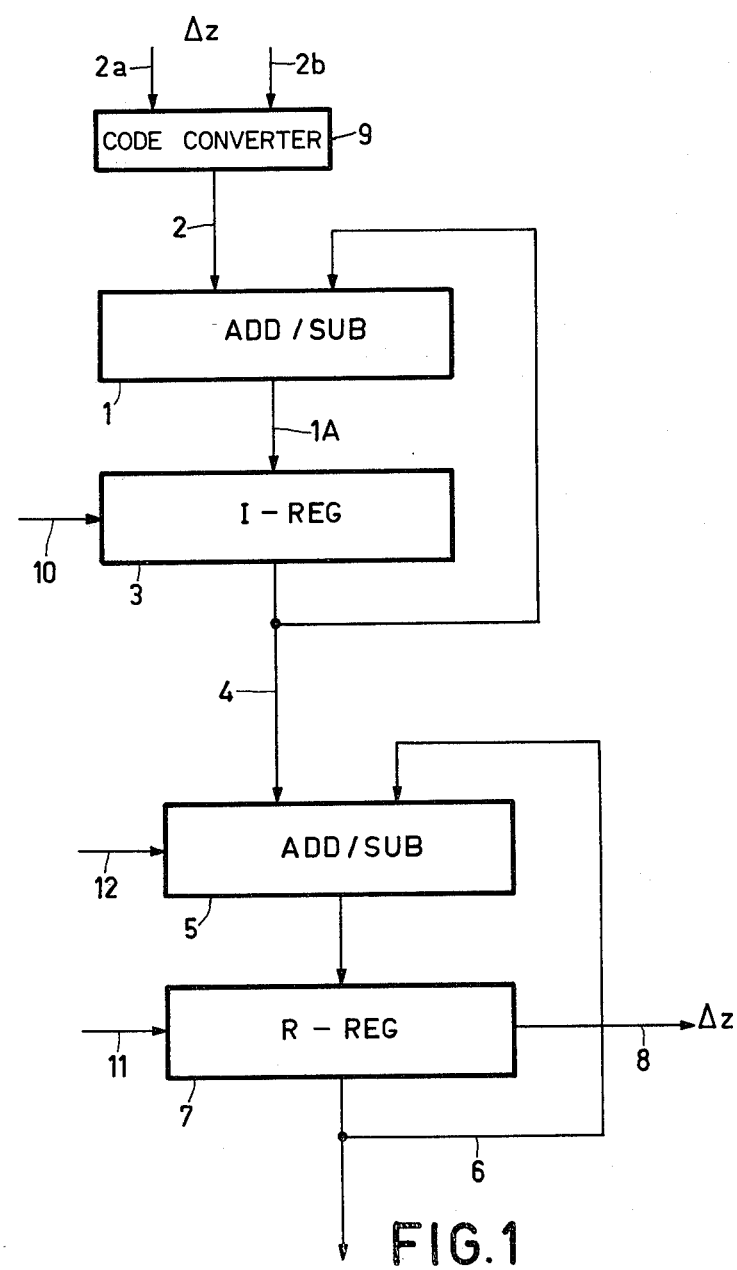
FIG. 1 shows the block diagram of an integrator based on the DDA technique.

FIG. 1 shows the construction principle of an integrator based on the DDA techique. This integrator comprises the actual integrator section with an adder/subtractor 1 and a register 3, so that on line 4 a binary word is formed whose value corresponds to the integral of the input increment signals $\Delta z$ supplied via line 2. The register 3 is referred to as the increment register.

The adder/subtractor 1 may be a customary adder module for binary numbers which receives the numbers to be processed via the lines 2 and 4. The output of the adder 1 is connected, via line 1A, to the register 3 which stores the signal on this output and supplies it on the output line 4 under the control of a clock signal on control input 10. The frequency of this clock signal should at least equal the maximum frequency at which the increment signals appear on the output 2.

The line 2 constitutes the output of a code converter 9 which converts the supplied input increment signal, actually consisting of two signals, i.e. a value signal ($\Delta z$) and a sign signal (sign $\Delta z$), into the known two's-complement notation which can be directly processed by the adder 1. A negative increment in this notation is subtracted from the binary word present on the line 4. In the example shown in FIG. 1, moreover, it is assumed that the code converter 9 receives two separate increment signals on inputs 2a and 2b, each of which consists of two signals ($\Delta z$, sign $\Delta z$) and which are summed already by the code converter 9. A sum integrator is thus formed. In the case of a corresponding multiple construction of the code converter, this sum integrator can also simultaneously process more separate input increment signals, so that on the output 2 it produces each time the sum of the simultaneously present increments as a binary number. The code converter 9 may alternatively be constructed for only one input increment signal. A plurality of simultaneously produced input increment signals are then consecutively applied thereto. The clock pulse on the control input 10 should then have a correspondingly higher frequency.

Thus, on the line 4 a binary number is generated which corresponds to the integral of all increment signals $\Delta z$ supplied. Therefore, the register 3 is referred to hereinafter as an increment register. In order to enable the use of the integration result in further operations according to the DDA technique, it must first be converted into an increment signal again. This is realized by means of the modulator section which comprises an adder/subtractor 5 and a register 7. The integration value present on the line 4 is applied to one input of the adder subtractor 5, the other input thereof receiving the output signal of the register 7 via line 6. The control input 11 receives a clock signal and with each pulse of the clock signal the output result of the device 5 is stored in the register 7, so that the signals on the lines 4 and 6 are algebraically added. If the arithmetic element must perform an inversion, the device 5 is switched over to a subtraction by a control signal on line 12. Each time when the result of the operation in the device 5 exceeds the limits imposed, an output increment signal $\Delta z$ appears. The limits are on the one hand the register capacity and on the other hand the value limit $-1, 0$; in this respect, the two's-complement notation used is to be noted. The sign of the output increment signal is determined by the direction in which said limits are exceeded. As the integration value present on the line 4 is higher, the more often the limits will be exceeded, so that the mean frequency of the output increment signals $\Delta z$ is proportional to the integration value on the line 4. In the case of a maximum integration value, an increment signal $\Delta z$ could also be generated on the line 8 with each clock pulse on the line 11. The remainder after the generating of the output increment signal on the line 8 which remains in the register 7 is maintained; therefore, the register 7 is also referred to as the remainder register or R-register. This operation can be presented so that only the integer numbers on the line 8 are transferred, while the parts behind the decimal point are maintained in the R register.

The time constant of the integrator results from the quotient of the register capacity (or register length) and the clock frequency and can be influenced by variation of these quantities. The inaccuracy of the arithmetic elements is inversely proportional to the register length. Inaccuracy and speed, therefore, are related so that their quotient is constant when the clock frequency is constant.

Various complex circuits also require potentiometers. In the DDA technique, the use of a potentiometer means that the frequency of the increment signals is divided by a corresponding factor. In principle this can be realized with the modulator section of the integrator shown in FIG. 1. To this end, the value signal $\Delta z$ of the increment frequency to be divided is applied as a clock signal to the control input 11 of the R register. Furthermore, the control signal on the line 12 is applied, via an EXCLUSIVE-OR element (not shown), to the adder/subtractor 5. The sign signal (sign $\Delta z$) associated with the increment frequency to be divided is applied to the other input of said EXCLUSIVE-OR element. The value of the binary number supplied via the line 4 in relation to the maximum feasible number of the register 7 determines the divider of the frequency of the increment signal and hence the potentiometer setting.

Figure 2:
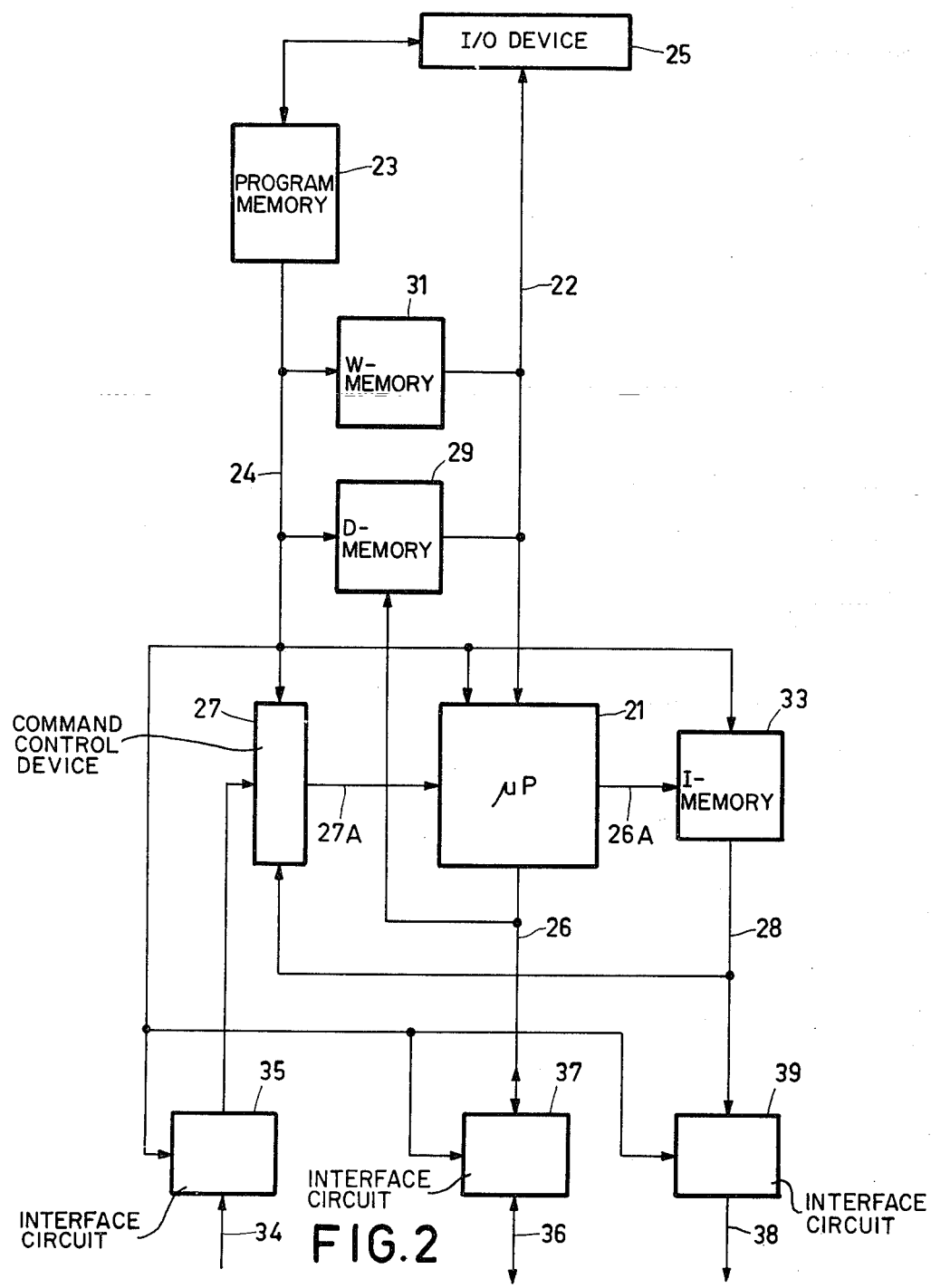
FIG. 2 shows a microprocessor with associated circuits for realizing a number of arithmetic elements.

FIG. 2 shows the construction of a device which performs the function of a plurality of elementary arithmetic elements as shown in FIG. 1. A central element thereof is formed by the microprocessor 21 which may be a commercially available module. The following description is given as an example for a microprocessor of the type Am2901, make Advanced Micro Devices, Sunnyvale, Calif. 94086, the basic lay-out of which will be described with reference to FIG. 3.

The microprocessor comprises a so-called arithmetic logic unit (ALU) 51. This unit can process two binary numbers supplied by the selector 53 in different manners, depending on the signal combination on a multiple control line 62, which is in this case shown only as a single line. This control line and further control lines originate from a decoder which is also present on the semiconductor substrate and which can receive 9-bit micro-code signals. This is not shown for the sake of simplicity. The operand/address lines have a width of four bits, which is denoted by a corresponding digit. A result line 60 of the unit 51 is connected to a multiplexer 55 as well as to a memory 57 which is addressed by address signals on lines 50, 52. The output of the multiplexer 55 is connected to a data bus line (not shown) for the outputting of the data. The lines 54, 56, 58, 60 thus have a quadruple construction.

Each of the lines 50 and 52 also consists of four separate lines, because the memory 57 in this case comprises 16 storage locations for each four-bit word, two memory locations being simultaneously addressed via the two address lines 50 and 52. The synchronization thereof is realized by means of a clock signal (not shown). The data words addressed in the memory appear on the output lines 56 and 58, respectively. The output lines 56 and 58 are connected to inputs of the selector 53 which, moreover, receives data words, via the multiple input 54, for example, from an external memory, and which also comprises a further input (not shown) which is connected, depending on the signal combination on the multiple control line 61, to the two data inputs 51A and 51B (also quadrupole) of the unit 51. In addition to the operation result on the output line 60, the unit 51 produces synchronized by the clock signal a plurality of control signals on relevant output lines. Thereof, only the line 65 for the most-significant bit (MSB) in the operation result and the line 66 as a location overflow (OVFL) are shown. These two control lines are used for generating the output increment signal, as will be described with reference to FIG. 4. For the further explanation of the said microprocessor Am 2901, reference is made to the documentation issued by the manufacturer. For the use of operands with more than four bits, several AM 2901 microprocessors can be connected in parallel. Similarly, other microprocessors and/or microcomputers can be used, but the low price of the Am 2901 is attractive.

Figure 3:
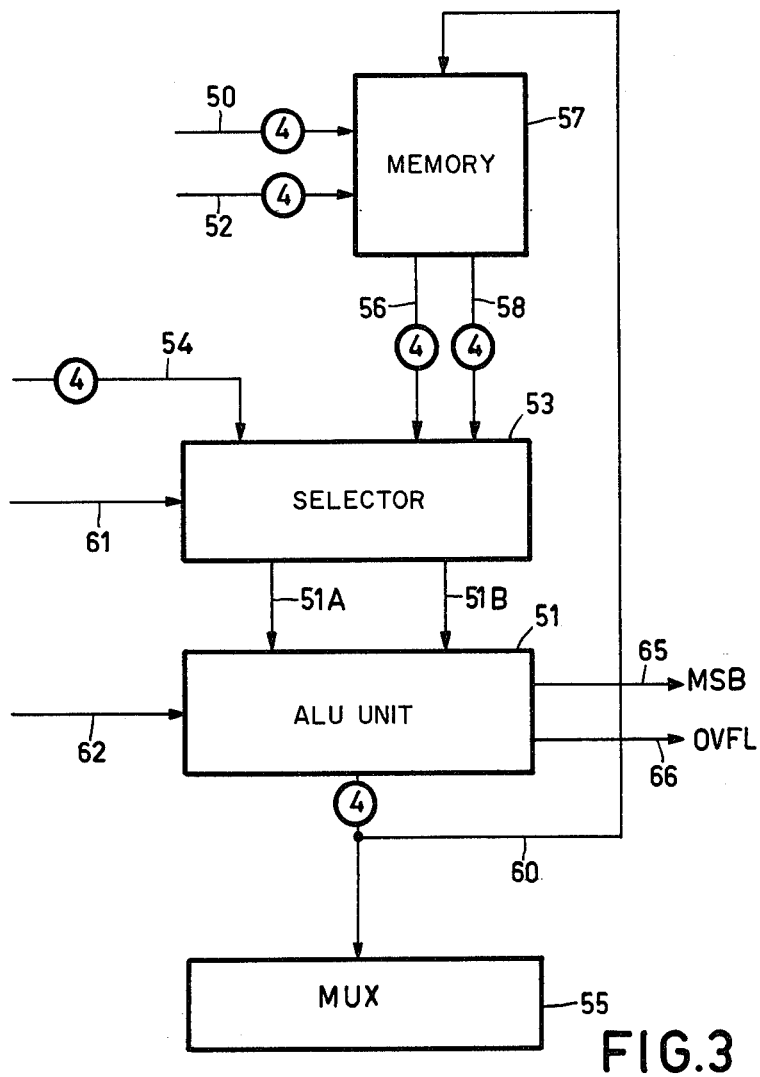
FIG. 3 shows the construction of a microprocessor in a simplified form.
Figure 4:
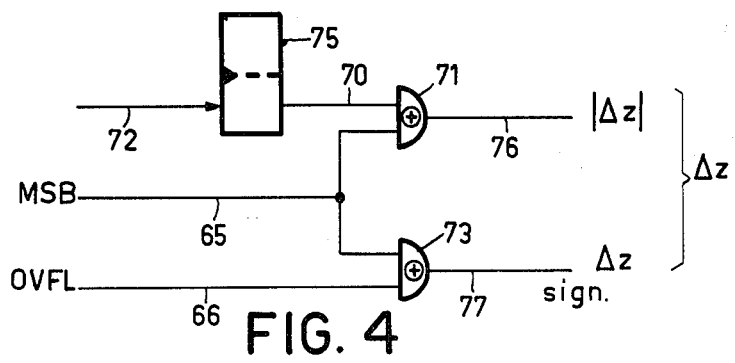
FIG. 4 shows a switching device for forming an output increment signal.

Referring to FIG. 4, the circuit for generating the output increment signal is constructed outside the microprocessor in this embodiment and inter alia comprises two EXCLUSIVE-OR gates 71 and 73. One input thereof is connected to the control output line 65 of the unit 51 in FIG. 3. The other input of the EXCLUSIVE-OR gate 71 receives, via the line 70, the most-significant bit of the R register, i.e. the value thereof prior to the processing. Thus, there are two possibilities. First of all, this originally supplied bit can remain available as the most-significant bit after the execution of the operation in the ALU unit 51, for example, on one of the lines 51A, 51B. However, usually this will not be the case. Said most-significant bit is then temporarily stored in a data flipflop 75 of a customary type. The data input 72 thereof is then connected to one of the most-significant bit lines of the multiple lines 51A, 51B. The load command (not shown) is then formed by one of the signals on the line bundle 62, i.e. the line which controls the input for the processing of the two four-bit binary quantities on the lines 51A, 51B in the arithmetic unit 51. This command for the flipflop 75 is generated only if the operation to be executed is an addition or subtraction. This condition can be formed by a customary logic function. When a signal appears on the line 65, the content of the flipflop 75 is available to form the EXCLUSIVE-OR function. On the line 76, therefore, the gate 71 always produces a value signal $\Delta z$ for the output increment signal if the sign of the R-register content changes due to the processing. This is the case on the one hand if the content of the R register, i.e. the accumulator register of the ALU unit, has passed through the value range $0/-1$, or if on the other hand the maximum value is exceeded. In this respect it is to be noted that for the representation of binary numbers in two's-complement notation the positive and the negative maximum value directly adjoin. As a result, a value signal $\Delta z$ of the increment is generated each time when the R register has passed through its total positive or negative numerical capacity.

The sign signal (sign $\Delta z$) is generated by the EXCLUSIVE-OR gate 73 on the output line 77, that is to say in dependence of the direction in which the content of the R-register exceeds the maximum value or the zero position. As a result of the formation of this logic function, the output line 77 also carries a signal "1", (if the output line 76 for the value signal of the increment carries a signal "0", but without a value signal, the sign signal is not recognized as being different from zero (+0) and $-0$ then have the same effect). The elements 5 and 7 of FIG. 1 are thus implemented by the circuit of FIG. 4 in cooperation with the ALU unit 51 of FIG. 3 and the selector 53 connected thereto. Obviously, the ALU unit 51 can perform a multitude of operations. First of all, the ALU unit can also implement the elements 1 and 3 of FIG. 1, because these elements actually have the same configuration as the elements 5 and 7. Furthermore, a large number of logic and organizational operations may be useful; these operations are sufficiently elaborated in the documentation issued by the manufacturer.

In FIG. 2, the microprocessor (FIG. 3) and the circuit for generating the output increment signals (FIG. 4) are shown together as a single block 21. The data is received on line 22 (54 in FIG. 3) and is output on line 26 (60 in FIG. 3, the multiplexer 55 having been omitted). The output increment signals appear on line 26A, (76, 77 in FIG. 4) and control signals are received on lines 24, 27A (input lines for the microcode-decoder not shown). The arrangement of FIG. 2 furthermore includes a program memory 23 which internally includes the associated control members, a data word memory 29 for a number of memory words, a weighting memory 31, an increment memory 33 for the output increment signals generated, an input/output device 25 (I/O), a command control device 27 and interface circuits 35, 37 and 39, the latter circuits being provided each time for a number of incremental or digital input and output signals. The input/output device 25 may be, for example, a keyboard or also a higher-hierarchy universal digital computer. The program memory 23 first of all comprises a memory for macro commands which contains commands for fetching different arithmetical algorithms such as squaring, root extraction, etc. and control algorithms; the latter is the case if the relevant device forms part of, for example, a process control system. The program memory furthermore comprises a microprogram memory which is controlled by the memory for macro commands and which contains the detailed microprograms for the execution of the algorithms. One or more control circuits of possibly a very different structure are realized by the complete program. Each control signal itself may involve different operations according to the DDA principle. For a selection of such possibilities, reference is made to the book "The digital differential Analyser".

The microprocessor 21(Am 2901) comprises a memory with sixteen word locations, so that eight operations can be performed on two operands without it being necessary to use an operand twice or without the supply of additional operand data being necessary. Each of these eight operations can thus implement as if it were another arithmetic element according to the DDA principle. The contents of the increment registers as well as of the R registers of these eight arithmetic elements are then present in the memory, so that no external memory is required. The single line 24 is actually of a multiple type for the transport of address signals as well as control signals in parallel operation. In an elementary series of operations, the program memory 23 produces a series of control signals and addresses on the line 24. Such a sequence each time controls an operation step of an other arithmetic element implemented in the microprocessor 21. The address signals for the memory 57 are applied directly to the microprocessor 21. On the other hand, the control signals for controlling the microprocessor 21 are applied to the command control device 27. On line 28, this device receives output signals from the output increment memory 33 and from the interface circuit 35 it receives signals which can be received from the environment on line 34 and which also act as output increment signals. Controlled by the latter two categories of signals, the command control device is capable of modifying the control signals received on the line 24. This will be described with reference to FIG. 5. The input 34 for the increment signals originating from the environment consists of a number of lines for different increment signals which have been generated elsewhere. The element 35 in this respect acts as an input multiplexer and, under the selective control of a signal on the multiple line 24, it can select and conduct at the most one increment signal on the line 34. On the other hand, via the line 34, logic signals which originate from the environment and which influence the command modification can also be supplied. Examples of the command modification by the command control device 27 will yet be described in detail.

The output increment signals generated during the processing in the microprocessor 21 are stored in the increment memory 33 which is also activated and addressed via the line 24. The reading of this memory is also realized by way of activation and addressing signals on the line 24. The output increment signals read can be applied, via the line 28, to the command control device 27 and also to the interface device 39. The latter device receives command signals on the line 24 for the selective distribution of the output increment signals over the multiple line 38. The latter line is shown as a single line for the sake of simplicity.

On the output line 26 of the microprocessor (the output of the multiplexer 55 in FIG. 3) the content of a register can be transported as a four-bit binary number. Transport can take place to the data word memory 29 or to the interface circuit 37 which is connected to the external line 36. The latter line is of a bidirectional type, so that data can be applied to the memory 29 also via the interface circuit 37. The memory 29 is addressed and the units 29 and 37 are activated (also direction selection) by means of control signals on line 24.

If more than eight arithmetic elements are to be realized, the internal memory of the microprocessor 21 is inadequate; for this case there is provided an external memory 29 which is also controlled and addressed by command signals on the line 24. The individual arithmetic elements are then cyclically combined in blocks of at the most 16 arithmetic elements each, and the operation is as follows.

Initially, the memory 29 contains the content of the increment register (element 3 in FIG. 1) for each arithmetic element. First the contents of these increment registers are successively read from the memory 29 and written into the internal memory of the microprocessor 21. In FIG. 3, this is realized via the line 54, the selector 53, the unit 51 which is activated, for example, to add a 0, and the line 60 under the control of the command control device 27 which in its turn is controlled by the program memory 23. During this data transfer, address control is also realized by the program memory 23, via the line 24, in the described manner. An integrator arithmetic element is then realized as follows.

The content of the associated increment register in the memory 57 of the microprocessor 21 is addressed and at the same time, via the line 22 a binary increment value is applied from the memory 31 to the microprocessor 21 and is added to the content of the increment register. The memory 31 does not contain the increments themselves, but a weighting factor, addressed via command signals on the line 24, in the form of a binary number. In its simplest form, this weighting factor is an integer power of 2, so a number with a single bit equal to 1, the remaining bits all being equal to 0. The use of weighting factors which deviate from each other each time by a power 2 has the same effect as variation of the length of the R register in FIG. 1. The use of weighting factors other than integer powers of 2 is also attractive. However, whether or not this binary number from the memory 31 is actually added in the microprocessor is determined by the actual value of the increment on the line 38 to be processed. Therefore, it is only when an increment is present in the command control device 27 that the function of the microprocessor 21 is controlled so that an addition takes place, the sign signal of the increment possibly converting the addition into a subtraction. When no increment is present, the operation is inhibited. The processing result is in this case stored in the memory 57 at the same address as previously read, so that the upper half of FIG. 1 has been implemented. A special aspect of an integrator consists in that in many cases the positive or negative maximum value may not be exceeded. If a location overflow occurs during the addition or subtraction, the storage of the result is inhibited, for example, by inhibiting the write clock for the relevant memories. A further possibility consists in that the location overflow signal switches over, by way of the command control device, the function of the microprocessor 21 so that the register content is not modified, for example, by way of the function "blocking" to be described at a later stage.

During the next processing step for this arithmetic element, the content of the associated R register is read from the memory 29 and is applied to the microprocessor 21, via the line 22, and at the same time the value of the increment register is read in the internal memory of the microprocessor, both values being added and being simultaneously written in the memory 29 again via the line 26. Any output increment then generated is stored in the increment memory 33.

For arithmetic elements with feedback the increment generated in the preceding cycle must always be present before the next processing step. This can be realized by storing in the memory 29, via the line 26, all output increments of the arithmetic elements in the preceding operation step of the relevant block of at the most 16 arithmetic elements. At the start of the next cycle of operation steps for this block, these output increment signals are read together with the contents of the increment registers in the memory 29. Via line 26A, the increment signals read are then written into the increment memory 33. The sequence of execution of the operation steps of the individual arithmetic elements determines whether the previous or the actual, newly produced increment signals are processed.

The increment to be processed can be weighted for varying the effective register length also by applying the increment, via the line 22, to the microprocessor 21 via a location shifting device. The microprocessor Am 2901 already comprises such a location shifting device in the form of an end-around coupling between the output of the arithmetic and logic unit (51) and an input of the selector (53) which is not shown. The increment signal may then be composed of a plurality of separate increments by a code converter (element 9 in FIG. 1). The same weighting for all individual increments then takes place. When use is made of the memory 31 in FIG. 2 for the described, quasi-indirect weighting, the increments must be consecutively processed in the case of a plurality of input signals for an arithmetic element.

For the block-wise processing, if the contents of the R registers are present in the memory 29 and are read only when they are required, the most-significant bit for generating the output increment (as described with reference to FIG. 4) is directly available and need not be intermediately stored. This advantage is obtained in that only the contents of the increment registers are stored in the memory of the microprocessor 21.

Figures 5, 6:
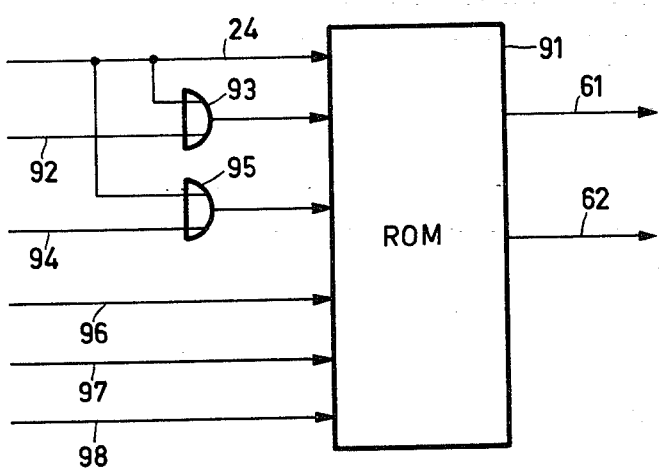
FIG. 5 shows a feasible construction of the command control device.
FIG. 6 shows a control signal table.

FIG. 5 diagrammatically illustrates a feasible construction of the command control device 27 of FIG. 2. In accordance with FIG. 5, the command control device comprises a read-only memory 91 which receives the command signals as address signals via the multiple line 24. Only a part of the relevant individual lines of the multiple line 24 is required for this purpose. This part is shown as a single line "24". Further address inputs of the read-only memory 91 are connected to the outputs of the OR-gates 93 and 95 and to the lines 96-98. One input of the OR-gate 93 is connected to a line of the multiple line 24 and the other input is connected to the line 92. The latter constitutes an output of a memory which is not shown in FIG. 2. The latter memory contains logic signals, notably the comparison results of comparisons, for example, of two different increment registers, which were previously executed during the program process. Via this address input and depending on the execution of the program from the program memory (line 24) or depending on the comparison result supplied via the line 92, the register content of the arithmetic element just implemented can be reset to zero, regardless of the other signals. To this end, the read-only memory 91 supplies signal combinations on the lines 61 and 62 which switch the selector 53 of FIG. 3 to a data source which then supplies exclusively zeroes, for example, the so-called Q-register in the Am 2901 microprocessor. Furthermore, the adder/subtractor 51 is then set for a function where these zeroes appear on the output on the line 60 and are written into the memory 57 or into the external memory 29 in the location of this register.

A further address input of the read-only memory 91 is connected to the output of the OR-gate 95, the one input of which is also connected to a line of the multiple line 24, its other input being connected to the line 94 which is also connected to the output of a memory for comparison results. A signal on one of these lines blocks the execution of a process step, that is to say the register content remains unmodified. To this end, the selector 53 is adjusted, via the line 61, so that the one data input of the unit 51 receives only zeroes. The other data input receives the register content read from the memory 57 on one of the lines 56 or 58, and a corresponding signal combination on the multiple line 62 adjusts the unit 51 for addition, so that the register content appears on the output on the line 60 in unmodified form and is written in the memory 57 or the memory 29 again.

A further address input of the read-only memory 91 is connected to the line 96 which receives a control signal, for example, from a comparison or from the program, in order to convert an addition to be executed into a subtraction or vice versa.

The lines 97 and 98 connected to further address inputs of the read only memory 91 contain the increment signals (for example, the signals appearing on the line 28 in FIG. 2) of the increment to be processed. If the value signal of the increment to be processed is 0, the read-only memory supplies the multiple outputs 61-62 with the same signals as in the case of blocking by an output signal from the OR-gate 95, independent of the sign signal of this increment. It is only when the value signal is 1 that the increment signal supplied via the input 54 in FIG. 3 is added to or subtracted from the register content read from the memory 57 or 29, respectively. The algebraic sign is again determined by the sign signal and the result is written back in the memory 57 or 29, respectively.

FIG. 6 shows said functions again in the form of a table. The columns contain the signal values associated with the line bearing the number given in the heading of the column. The symbol x means that the signal value is unimportant (don't care) because it has no effect. The multiple line 24 supplies, disregarding the lines to the OR-gates 93 and 95, a signal combination which is denoted by the decimal value 2 in the table for the sake of simplicity. Below the numbers 93 to 98 the function of the lines is stated, i.e. erasing (ERA), blocking (BLOC), inverting (INV), and result (RES). In column 60, R is the register content and I is the increment signal.

In the columns 61, 62, the signal combinations on the relevant lines, which may be considered as binary numbers, are stated as a corresponding decimal value.

This example relates notably to the function as an integrator. For other functions, for example, for a modulator or a potentiometer, the signal combinations are accordingly.

The command control device 27 may also be used for pure digital processing steps of the microprocessor, for example, multiplication of two binary numbers. To this end, the read-only memory 91 comprises further address lines which are controlled in dependence of the individual locations of the multiplicator and which generate corresponding control signals on the lines 61 and 62 and on further control lines for elements of the microprocessor which are not separately shown in FIG. 3 and for any circuits connected thereto.

The use of the command control device for the direct modification of the commands offers the advantage that the microprograms may be simpler.

The construction shown in FIG. 5 is only one possibility of realizing the command control device 27 of FIG. 2. It may also be constructed as a network of logic connections which supply the signals on the line 24 suitably modified on the output in order to generate the control signals of the lines 61 and 62 and possibly further control signals.

What is claimed is:

1. An arithmetic element for processing digital input increment signals, the frequency of which indicates an analog quantity, notably digital input increment signals comprising a sign signal according to the DDA (digital differential analyzer) principle, comprising at least one arithmetic device for executing add and subtract operations (adder/subtractor) and at least one operand register which is connected to a data input of the arithmetic device, characterized in that the arithmetic device comprises:

(a) a program memory (23) for supplying program signals on a first output (24);
   (b) a microprocessor (21) with a first input which can be coupled to said first output and having an adder/subtractor (51) with a data output (26);
   (c) a command control device (27) which is connected between said first input and first output and which comprises a second input for receiving a control signal in order to modify a program signal;

wherein there are furthermore provided:
   first EXCLUSIVE-OR-means (71) having inputs connected to the most significant bit position (65) on said data output and to the most significant bit position on said operand register (29) for generating a value signal ($\Delta z$) of an output increment signal and second EXCLUSIVE-OR-means (73) having inputs connected to the most significant bit position on said data output and to a location overflow bit position (66) for generating a sign signal (sign $\Delta z$) of the output increment signal.

2. An arithmetic element as claimed in claim 1, characterized in that for the execution of a predetermined number of separate operations according to the DDA principle, said operand register (29, 57) has a multiple construction and a capacity for the combined storage of at least one operand signal for each of said predetermined number of separate operations, said program memory having a cycling addressing means and a data output connected to an input of said adder/subtractor (51) for upon reception of a series of address incrementing signals having a predetermined number of memory locations of said program memory addressed, each memory location accommodating an operand signal, for processing in said adder/subtractor together with associated frequency analog signals, a memory (33) being provided which comprises, for each of said predetermined number of separate operations, a memory location in order to receive and store an output increment signal from said adder/subtractor.

3. An arithmetic element as claimed in claim 2, in which the microprocessor includes its own memory (57) with several memory locations, further including means to assign each of said several memory locations to another one of said predetermined number of separate operations such that, when an operation activates two input quantities in said own memory, the memory location assigned to the relevant operation acts as an increment register (3).

4. An arithmetic element as claimed in claim 3, in which the number of said several memory locations is smaller than said predetermined number, further including means to execute cyclically, block-wise successively the processing steps for said separate operations such that the microprocessor (21) first takes over the contents of a number of external increment registers (29) associated with a block of operations in its own memory (57), successively performs the processing steps for these operations, and reads at the same time the new value of the output increment signals for writing in said external increment registers (29), and finally starts the taking over of the signal values of the next block of operations.

5. An arithmetic element as claimed in claim 1, characterized in that the command control device (27) comprises a read-only memory (91) with address inputs in order to be addressed by command control signals from the program memory (23) and also by further control signals which are derived from comparison results of preceding comparisons of register contents, combinations of control signals being stored at the memory locations thus addressable for the control of the adder/subtractor of the microprocessor.

6. An arithmetic element as claimed in claim 1, characterized in that for the weighting of an increment signal to be processed there is provided a weighting memory (31) which contains corresponding multiples of the increment unit in memory locations which are addressed by weighting factor signals, the output of the weighting memory (31) being connectable to an operand input of the adder/subtractor (51), the command control device (27) comprising an address input for receiving an input increment signal to be processed in order to modify a control signal.

* * * * *